J. PETRY.
DENTAL PLATE.
APPLICATION FILED APR. 22, 1909.
963,172.
Patented July 5, 1910.
2 SHEETS—SHEET 1.
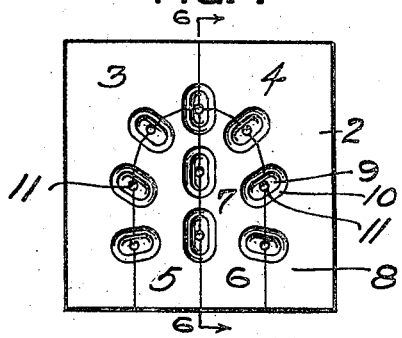
FIG. 1
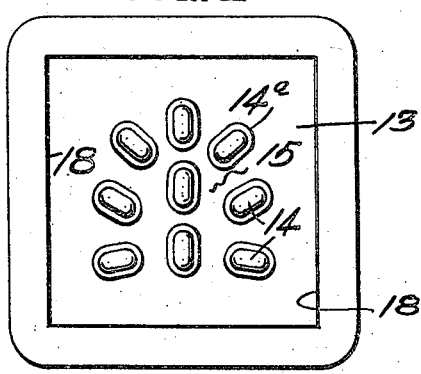
FIG. 2
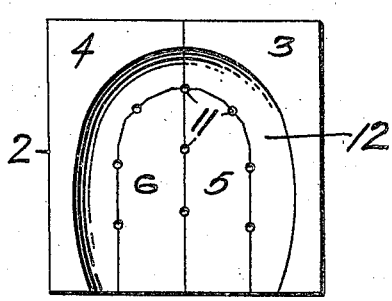
FIG. 3
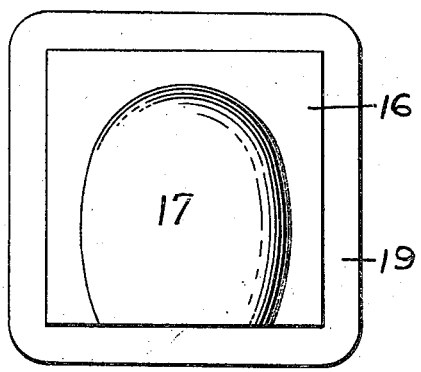
FIG. 4
FIG. 5
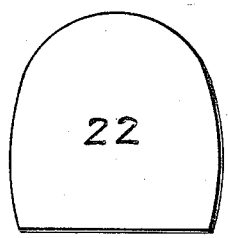
FIG. 6
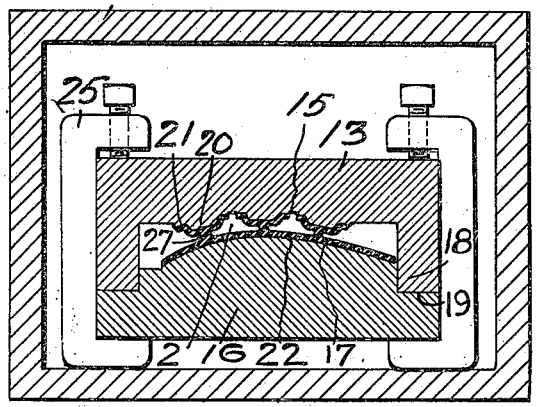
FIG. 7
WITNESSES.
J. R. Keller
John F. Will.
INVENTOR.
Jacob Petry
By Kay & Totten
attys

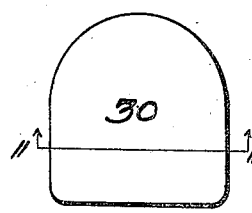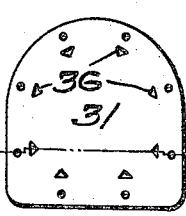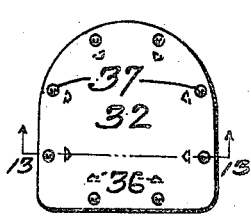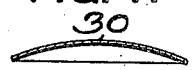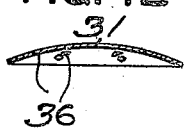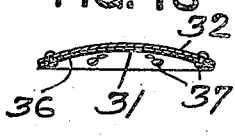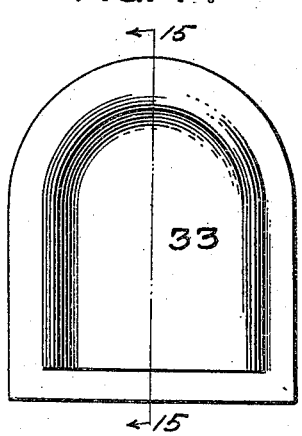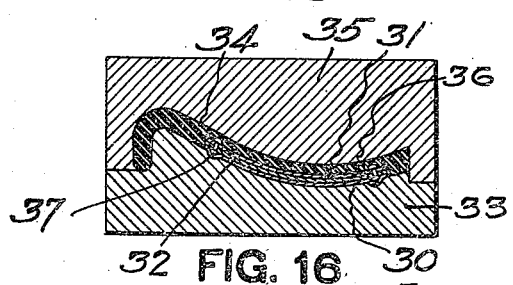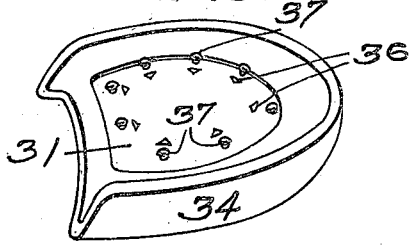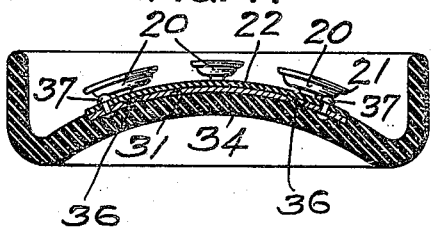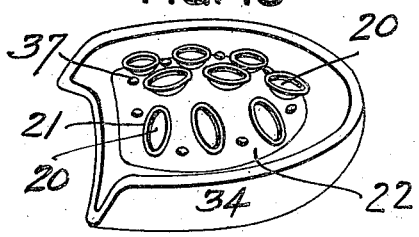

UNITED STATES PATENT OFFICE.

JACOB PETRY, OF PITTSBURG, PENNSYLVANIA.

DENTAL PLATE.

963,172.  Specification of Letters Patent.  Patented July 5, 1910.

Application filed April 22, 1909. Serial No. 491,625.

*To all whom it may concern:*

Be it known that I, JACOB PETRY, a resident of Pittsburg, in the county of Allegheny and State of Pennsylvania, have invented a new and useful Improvement in Dental Plates; and I do hereby declare the following to be a full, clear, and exact description thereof.

My invention relates to a process of making dental plates, its object being to provide a simple process by means of which the dental plates may be produced in such form that they may be readily fitted to and attached to the mouth plate with very little labor on the part of the dentist.

To these ends my invention comprises the process as fully hereinafter set forth and claimed.

In the accompanying drawings Figure 1 is a top view of a female die; Fig. 2 is a plan view of the male die; Fig. 3 is a view of the female die inverted; Fig. 4 is a plan view of the bottom die; Fig. 5 is a view of the rubber plate; Fig. 6 is a cross section through the dies showing the rubber plate in the process of formation, the section being taken on the line 6—6 Fig. 1; Fig. 7 is a view of the finished rubber plate; Figs. 8, 9 and 10 are views of the metallic plates employed; Figs. 11, 12 and 13 are sectional views of the same; Fig. 14 is a view of the bottom die; Fig. 15 is a cross section of the upper and lower die showing the metal plates therein; Fig. 16 is a view of the finished dental plate; Fig. 17 is a section of the dental plate showing the rubber plate attached thereto; and Fig. 18 is a perspective view of the dental plate.

The first part of my invention pertains to the production of the rubber suction-plate which is afterward attached to the dental plate and this suction plate is produced in the following manner: I employ a female die 2 which is formed in parts, the die illustrated being composed of four parts, 3, 4, 5 and 6. The upper face of the die is made to approximate the general outline of the roof of the mouth, having the central raised curved portion with the outer grooved portion 8. Formed in the female die 2 are the recesses 9 which may be of any suitable number and arranged in such a way as to be distributed over the rounded surface of the die for the purpose more fully hereinafter set forth. These depressions 9 are formed with the shoulders 10 and apertures 11 are formed at about the center of said depressions, extending through to the opposite face of the die, as shown in Fig. 3. The opposite face of this die 2, as shown in Fig. 3, is made with the large depression 12. The male die 13 is provided with the projections 14 and shoulders 14ª corresponding to the depressions 9 and shoulders 10 of the die 2, and adapted to engage the same. The central portion of the die 13 is accordingly hollowed out, as at 15, to correspond to the central rounded projecting portion 7 of the die 2. The bottom die 16 has the rounded portion 17 which fits in the depression 12 of the die 2. When these dies are assembled, as shown in Fig. 6, the flanged portion 18 of the die 13 rests upon the shoulder 19 of the bottom die 16, the die 2 being held between the upper die 13 and the lower die 16.

Rubber cups 20 are inserted in the depressions 9 of the dies 2, said cups having the flanges 21 which rest upon the shoulders 10 of said cups. A rubber plate 22 is placed upon the rounded portion 17 of the die 16 and the die 2, carrying the cups 20, is then supported by the die 16, whereupon the upper die 15 is placed in position with its flange 18 resting on the shoulder 19 of the lower die so as to bring the projections 14 into engagement with the rubber cups 20. The parts when thus united form a flask and this flask is placed in a suitable vulcanizing furnace 24. By means of the clamps 25 a high pressure is applied to the rubber cups 20 and the rubber plate 17, and as the vulcanizing process proceeds the rubber is forced up through the openings 12 in the dies 2 and the cups 20 are thus united with the plate 17, forming an integral structure therewith. Accordingly, when the vulcanizing process has been completed, upon removing the flask from the furnace and releasing the parts, the result will be the plate 22 with the cups 20 formed integrally therewith. The dies 2 being made in several parts, as indicated, makes it possible to remove the plate 22 with the cups attached, the connection between the cups and the plate 22 being made by the necks 27. Holes 28 are then formed in the suction-plate 22 at suitable intervals for the purpose hereinafter set forth.

The next feature of my invention relates to the formation of the dental-plate in such a manner that the rubber plate 22, carrying the cups 20, may be attached to the said dental-plate. Accordingly I provide the metal plates 30, 31 and 32. These plates are formed of aluminum or other suitable metal of a flexible character, and the plate 30 is inserted into the lower die 33 resting on the depressed bottom thereof. The plates 31 and 32 are riveted together, as indicated in Fig. 13, and these plates are then placed on the plate 30, as indicated in Fig. 15. The dental-plate 34 is then adjusted in position to conform to the upper face of the dies 33, whereupon the upper die 35 is placed in position and pressure is applied. The plate 31 is provided with the openings 36 at intervals, said openings being illustrated as triangular in form. This plate 31 is in direct contact with the rubber of the dental plate 34 and when the pressure is applied the rubber of the dental plate will be forced into the openings 36 so as to connect the plate 31 to the dental-plate 34. When the proper connection has been made in this manner between the dental-plate 34 and the metal plate 31 the upper die 35 is removed and the dental-plate is then removed from the die 33. The plate 30 is readily removed, as it is not fastened in any way to the other plates, but in order to remove the plate 32 it is necessary to cut the metal around the rivets 37 so that the plate 32 may be removed from the plate 31. Upon the removal of the plate 32 from the plate 31, the plate 31 will be left embedded in the dental-plate 34 and the rivets will project up from said plate, as indicated in Fig. 16. The plate 31 will be slightly below the surrounding portions of the dental-plate, as indicated in Fig. 16. The dental-plate is now provided with means for attaching the suction-plate 22 thereto and accordingly the suction-plate is attached to the rivets 37 by the openings 28 in the plate 22, said openings being stretched to pass over the rivet heads and when the rubber resumes its normal position the plate 22 is held securely in position by the heads on the rivets 37. The finished plate will then have the appearance shown in Figs. 17 and 18.

By my invention it is possible to supply the dentists with the plates 22 carrying the cups formed integral therewith, as well as the metal plates 30, 31 and 32, so that it is a very simple matter for the dentist with these parts to make up his dental-plate and secure the metal plates thereto in position to receive the rubber plates 32. Having once formed the dental-plate to conform to the shape of the mouth the insertion of the metal plates is a very simple matter, as they are flexible and readily conform to the shape of the dental-plate and after that has been accomplished the only thing to be done is to attach the rubber suction-plate 22 which can be done quickly and without the slightest difficulty.

What I claim is:

1. The method of forming suction-plates for dental-plates, consisting in inserting rubber cups in depressions in a suitable die, supporting a rubber plate on the opposite side of said die, applying pressure and forcing the rubber through openings in said die, and vulcanizing the rubber and thereby forming an integral connection between the cups and said plate.

2. The method of forming dental-plates consisting in applying riveted metal plates to the surface thereof, subjecting the plates to pressure, forming an interlocking connection between the inner one of said plates and the dental plate, and removing the outer plate.

In testimony whereof, I, the said JACOB PETRY have hereunto set my hand.

JACOB PETRY.

Witnesses:
F. WARREN KAY,
JOHN F. WILL.